(12) United States Patent
Finn et al.

(10) Patent No.: US 11,318,959 B2
(45) Date of Patent: May 3, 2022

(54) ESTIMATING TRIP DURATION BASED ON VEHICLE REROUTE PROBABILITIES

(71) Applicant: GM Cruise Holdings LLC, San Francisco, CA (US)

(72) Inventors: Nolan Finn, San Francisco, CA (US); Yanni Cao, San Mateo, CA (US); Charles Bruce Matlack, San Francisco, CA (US); Chen Xie, San Francisco, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 58 days.

(21) Appl. No.: 16/880,522

(22) Filed: May 21, 2020

(65) Prior Publication Data

US 2021/0362747 A1 Nov. 25, 2021

(51) Int. Cl.
*B60W 60/00* (2020.01)
*G01C 21/32* (2006.01)
*G01C 21/36* (2006.01)
*G01S 19/42* (2010.01)
*G01C 21/34* (2006.01)

(52) U.S. Cl.
CPC ......... *B60W 60/0021* (2020.02); *G01C 21/32* (2013.01); *G01C 21/3415* (2013.01); *G01C 21/3691* (2013.01); *G01S 19/42* (2013.01)

(58) Field of Classification Search
CPC .. B60W 60/0021; G01C 21/20; G05D 1/0088
See application file for complete search history.

(56) References Cited

U.S. PATENT DOCUMENTS

| | | | |
|---|---|---|---|
| 2013/0144526 A1* | 6/2013 | Fuchs | G01C 21/3492 701/533 |
| 2018/0095471 A1* | 4/2018 | Allan | G05D 1/0088 |
| 2018/0136662 A1* | 5/2018 | Kim | G01C 21/3415 |
| 2019/0108753 A1* | 4/2019 | Kaiser | H04W 4/02 |
| 2019/0128681 A1* | 5/2019 | Hans | G06F 16/29 |
| 2020/0011671 A1* | 1/2020 | Puri | G08G 1/096805 |
| 2020/0149900 A1* | 5/2020 | Chipouras | G01C 21/3626 |
| 2020/0271470 A1* | 8/2020 | Symanow | G01C 21/3691 |
| 2020/0393255 A1* | 12/2020 | Freese | G01C 21/3484 |

* cited by examiner

*Primary Examiner* — Yuri Kan
(74) *Attorney, Agent, or Firm* — Polsinelli, PC

(57) ABSTRACT

The subject disclosure relates to ways to improve route duration calculations e.g., estimated time of arrival (ETA) approximations, by taking consideration of reroute probabilities along a given vehicle path. In some aspects, the disclosed technology encompasses a process including steps for identifying a route between a first destination to a second destination, determining a reroute likelihood associated with at least one AV maneuver along the route, and calculating an estimated time of arrival (ETA) based on the reroute likelihood associated with at least one AV maneuver. Systems and machine-readable media are also provided.

20 Claims, 5 Drawing Sheets

ESTIMATING TRIP DURATION BASED ON VEHICLE REROUTE PROBABILITIES

BACKGROUND

1. Technical Field

The subject technology provides solutions for resolving driving route duration estimates and in particular, for accurately computing estimated time of arrival (ETA) figures based on reroute likelihoods for an autonomous vehicle (AV).

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
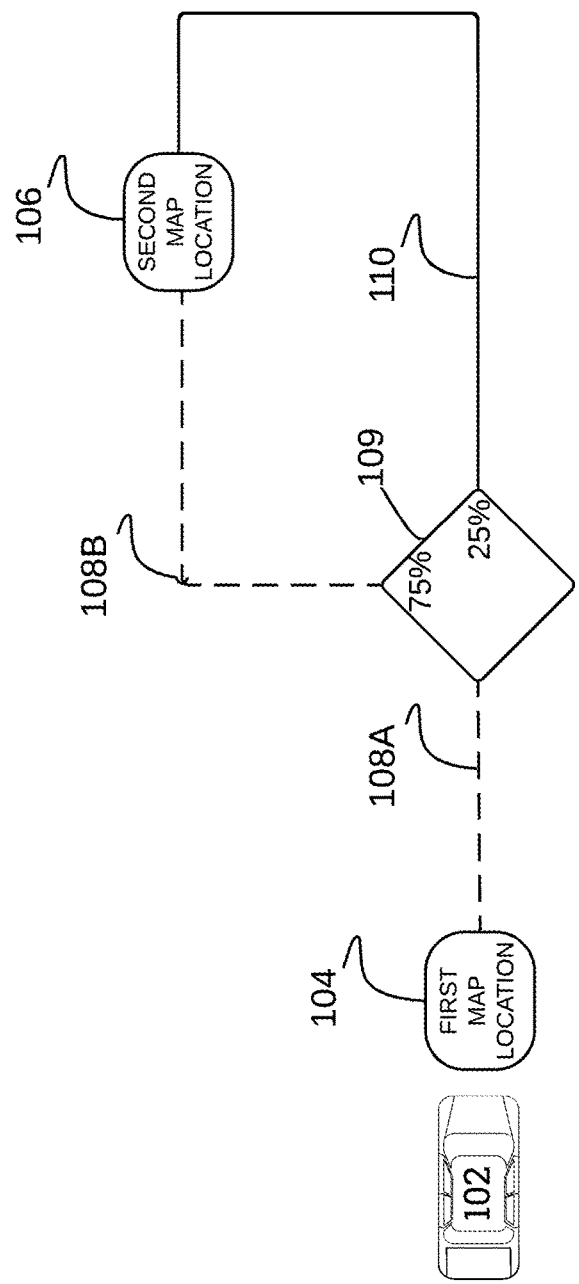
FIG. 1 illustrates an example of an autonomous vehicle route between a first map location and a second map location, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicle (AV) maneuvers are only executed when surrounding conditions are deemed to be safe. For this reason, many maneuvers that are easily performed by human drivers cannot be executed by an AV under similar conditions. Such limitations can lead to frequent re-routing, wherein the AV may select a longer or more congested path-to-destination to avoid the need to perform certain driving maneuvers. When following a pre-specified course, re-routes can cause deviations in estimated time of arrival (ETA) figures. As used herein, "maneuver" can refer to virtually any AV operation performed in the service of driving and/or navigation functions. By way of example, AV maneuvers can include, but are not limited to: turns, u-turns, lane changes, unprotected maneuvers (e.g., unprotected left-turns in an intersection), accelerating, decelerating, stopping, creeping, and the like.

Aspects of the disclosed technology address the foregoing limitations by providing solutions for accurately modeling trip duration estimates based on a likelihood of modifications to an initial route plan (i.e., based on a reroute likelihood due to maneuver failure event). Different factors can contribute to the reroute likelihood, including but not limited to: traffic conditions, environmental conditions, driving maneuver complexity required for the initial route plan, AV routing and navigation capabilities, etc. As discussed in further detail below, these various conditions can be subject to a variety of other variables, including but not limited to: time-of-day, season, weather conditions, existence of map priors, statistical confidence in map priors, and/or AV software version, etc.

In some aspects, ETA can be based on an initial estimate associated with an initial route between a first map location and a second map location. The initial estimate can then be modified (increased or decreased) based on reroute likelihoods for one or more junctures along the initial route. For example, reroute likelihoods can be computed for every intersection along the initial route and used to inform the resulting ETA. In some aspects, reroute likelihoods may be based on AV lane position, for example, that can correspond with a lane identifier (lane ID) that identifies lane position or ordering for various route segments in a map database.

Although different computation methods may be used, depending on the desired implementation, in some aspects the resulting ETA is a weighted sum of ETAs for various routes to the destination map location i.e., the second map location. Details of ETA computations of the disclosed technology are discussed in further detail below.

FIG. 1 illustrates an example of AV routes 100 between a first map location 104 and a second map location 106, according to some aspects of the disclosed technology. In the example illustrated in FIG. 1, AV 102 starting at first map location 104 plots an initial route 108, which includes route path segments 108A and 108B, to second map destination 106. On initial route 108, a left-turn maneuver is required at juncture 109, following route segment 108B. In this example, failure to complete the left-turn maneuver at juncture 109 may result in a need for AV 102 to reroute to second map location 106 via re-route path 110. It is understood that routes 108, 110 illustrate a simplified example of how different route paths may be used to reach an intended map destination (e.g., second map location 106), however, additional route-paths, as well as additional junctures/maneuvers are contemplated, without departing from the scope of the disclosed technology.

In practice, a reroute likelihood can be calculated at each juncture. In the illustrated example, the left-turn maneuver at juncture 109 has a determined success rate of 75%, indicating that there is a 25% probability that AV 102 will divert to re-route path 110 to reach second map location 106. In some approaches, the re-route likelihood is paired with a specific maneuver type (e.g., a left-turn, unprotected left-turn, turnabout, etc.). That is, the re-route likelihood can be based on a probability of maneuver success (or failure). The re-route likelihood can also be associated with a specific map location. For example, the re-route likelihood can be based on aggregated AV maneuver data indicating a history of successful maneuver completion at a specific location (map juncture). The reroute likelihood can also be based on map prior information that includes environmental features for a specific intersection. That is, maneuver failure probabilities can be estimated based on map prior information for similar map junctures (e.g., intersections) even if historic maneuver performance data is not available for a specific juncture. In this manner, reroute probabilities can be used to determine accurate ETAs even for routes that traverse map areas with sparse data. Additionally, as mentioned above, re-route likelihoods may also be based on an identified lane position (e.g., corresponding with a lane ID) of the AV. For example, the success/failure probability of the AV can be based on lane position before execution of a specific maneuver is required.

By way of example, in the map configuration depicted by FIG. 1, let it be assumed that the trip duration estimate (ETA) for route segment 108A, prior to the maneuver at juncture 109, is 10 minutes, and the ETA for route segment 108B following the maneuver (if successful), is 5 minutes. Additionally, let it be assumed that the ETA for route segment 110 (following a failed maneuver at juncture 109) is 10 minutes. In this example the total estimated duration (total ETA) is based on the reroute (maneuver failure) likelihood (25%), as well as the ETAs for each of the three trip segments. That is, the total ETA can be computed as a weighted sum:

$$ETA_{Total} = 10 \text{ min} + P_{Success}(5 \text{ min}) + P_{Fail}(10 \text{ min})$$

where $P_{Success} = 75\%$ and $P_{Fail} = 25\%$. Therefore, the total ETA ($ETA_{Total}$) may be estimated to be approximately 17.5 min. It is understood that, in some implementations, the total ETA computation may include additional terms, for example, corresponding to additional possible maneuver outcomes, and/or to additional maneuvers along each segment following an initial maneuver. For a maneuver with N outcomes, the computation can be given by:

$$ETA_{Total} = ETA_{Prior} + P_1(ETA_1) + P_2(ETA_2) + \ldots + P_N(ETA_N)$$

and, in the case of additional maneuvers along any given segment, the term $ETA_i$ is replaced by the weighted sum for the following maneuver along that segment (which in turn comprises all following maneuver sums), where $ETA_{Prior}$ is the duration from the prior maneuver until the current maneuver.

It is understood that route failure probabilities for one or more routes can be computed in real-time or near real time. Depending on the desired implementation, such computations may be wholly or partially performed by one or more computing devices in the AV and/or by various remote computing systems, such as one or more cloud compute nodes.

Figure 2:
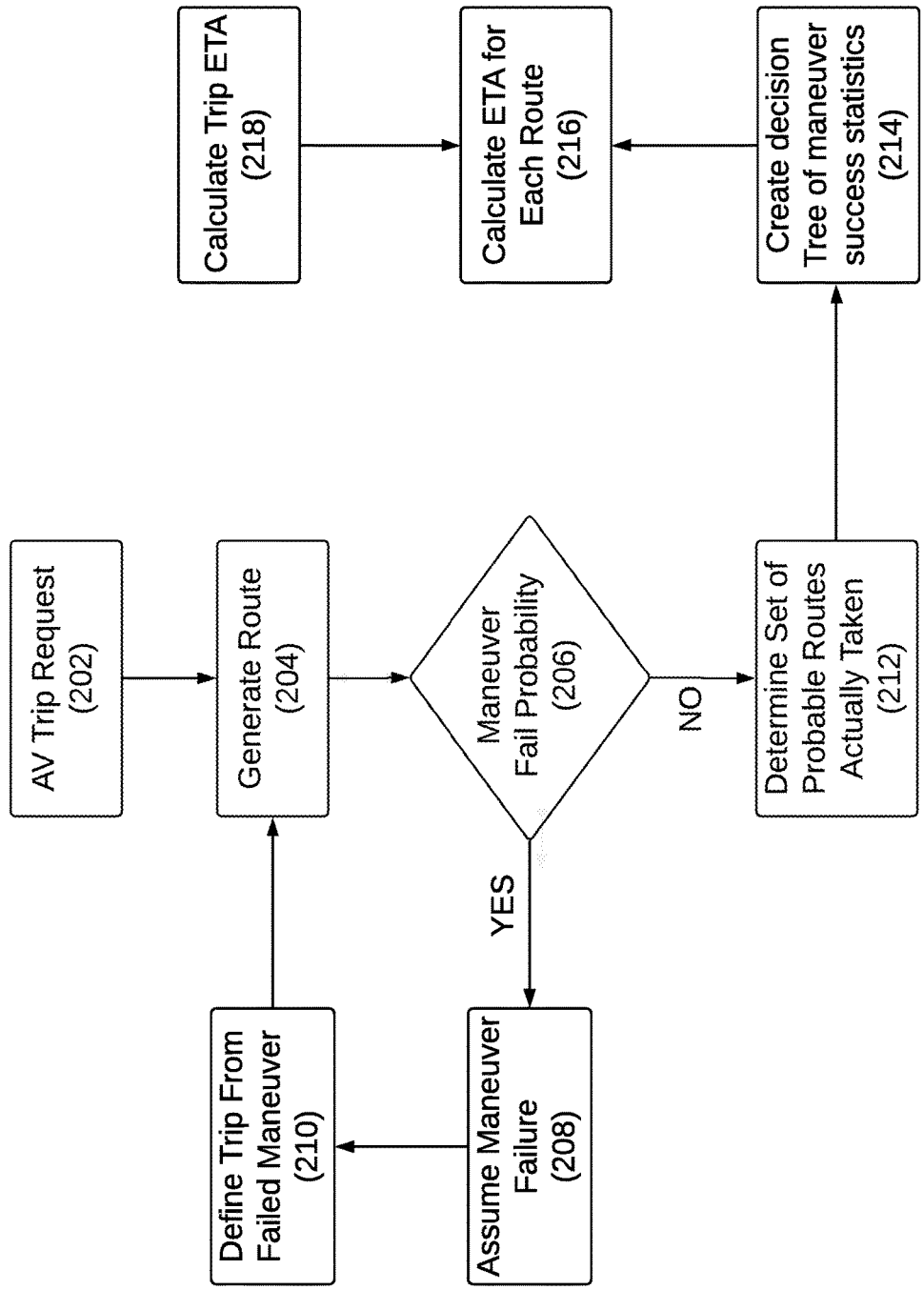
FIG. 2 illustrates a conceptual block diagram of a decision process for calculating an estimated time of arrival (ETA) for an AV route, according to some aspects of the disclosed technology.

FIG. 2 illustrates a conceptual block diagram of a process 200 for calculating an estimated time of arrival (ETA) for an AV route, according to some aspects of the disclosed technology. Process 200 begins with block 202 in which an AV trip request is originated, for example, by a user/rider of an AV ride-service. As discussed in further detail with respect to FIG. 4, the trip request may be initiated using a smartphone or other processor-based communication device.

In response to AV trip request 202, a route is generated, for example, from a current location of the AV (e.g., a first map location), to a destination specified by trip request 202 (e.g., a second map location). In decision block 206, a maneuver failure probability for the route generated at block 204 is analyzed. In some aspects, it can be determined if the likelihood of maneuver failure is higher than a predetermined threshold. For example, if the initial route generated in block 204 is determined to contain one or more maneuvers that have an unacceptably high failure probability, then a new route may be determined that eliminates one or more of the problematic maneuvers. In such aspects, process 200 advances to block 208, in which maneuver failure is assumed, and then to block 210 in which a new route is resolved. Process 200 then reverts to block 204.

Alternatively, if at decision block 206 it is determined that maneuver failure probabilities for the generated route (204) are acceptable, then process 200 proceeds to step 212 in which a set of probable routes are generated. In some aspects, the probable routes may include one or more re-route alternatives to the destination (e.g., second map location), that have been previously traversed by one or more AVs, for example, in an AV fleet. In some aspects, re-route paths may be identified using maneuver probabilities that are based on feature similarity. By way of example, if a mix of features such as road configuration, traffic lights, and/or traffic patterns, etc. for an unknown intersection are similar to those of a known intersection, then maneuver success likelihoods, and therefore re-route probabilities, may be assessed accordingly.

At block 214, a decision tree is generated based on maneuver success statistics. That is, one or more re-route alternatives are identified based on maneuver success probabilities at different map junctures. At block 216, trip duration (ETA) estimates are calculated for each possible re-route. Finally, at block 218, the trip ETA is calculated based on maneuver success statistics (214) associated with each route alternative (reroutes 216). As discussed above, the calculated trip ETA can be a sum of route durations weighted by the probability of each.

Figure 3:
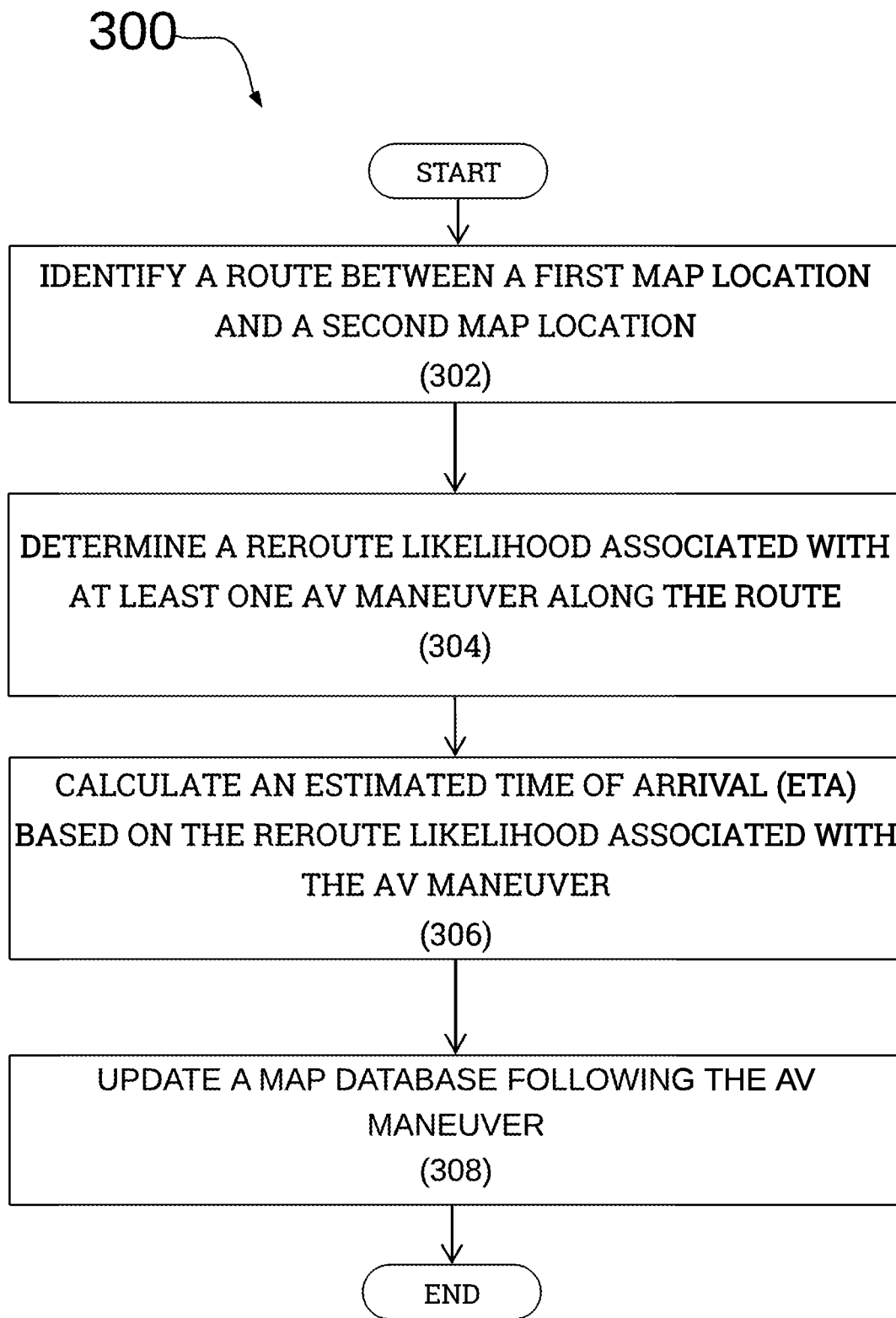
FIG. 3 illustrates steps of an example process for calculating an AV route ETA, according to some aspects of the disclosed technology.

FIG. 3 illustrates steps of an example process 300 for calculating an AV route ETA, according to some aspects of the disclosed technology. Process 300 begins with step 302 in which a route between a first map location and a second map location are identified. In some approaches, the first map location can represent a current or planned departure location of an AV, whereas the second map location can represent a destination of the AV, such as the indicated pick-up/drop-off location of a user/rider.

In step 304, the likelihood of a reroute is determined with respect to at least one AV maneuver to be performed along the initial route. Further to the example of FIG. 1, the re-route probability can equal the failure probability of AV execution of one or more driving maneuvers, such as an unprotected left turn, along the initial route. Maneuver failure probabilities may be determined from map priors (i.e., from historic maneuver completions statistics previously completed by one or more AVs). In some approaches, maneuver failure probabilities can be inferred from AV software version information. For example, software updates may improve AV maneuver performance, thereby lowering maneuver failure rates.

In step 306, an estimated time of arrival (ETA) figure is calculated based on reroute likelihoods associated with the AV maneuver. As discussed above with respect to FIGS. 1 and 2, the final ETA figure can be a weighted sum of ETAs and corresponding reroute (maneuver fail) probabilities associated with each alternative route path.

In optional step 308, a map database can be updated based on the success (or failure) of one or more AV maneuvers on the route. By way of example, if an AV successfully executes a maneuver, the maneuver failure probability for that particular maneuver (at that juncture/map location) may be decreased. Alternatively, if the AV fails to execute a maneuver at a particular map location or juncture, then the failure probability may be increased.

Figure 4:
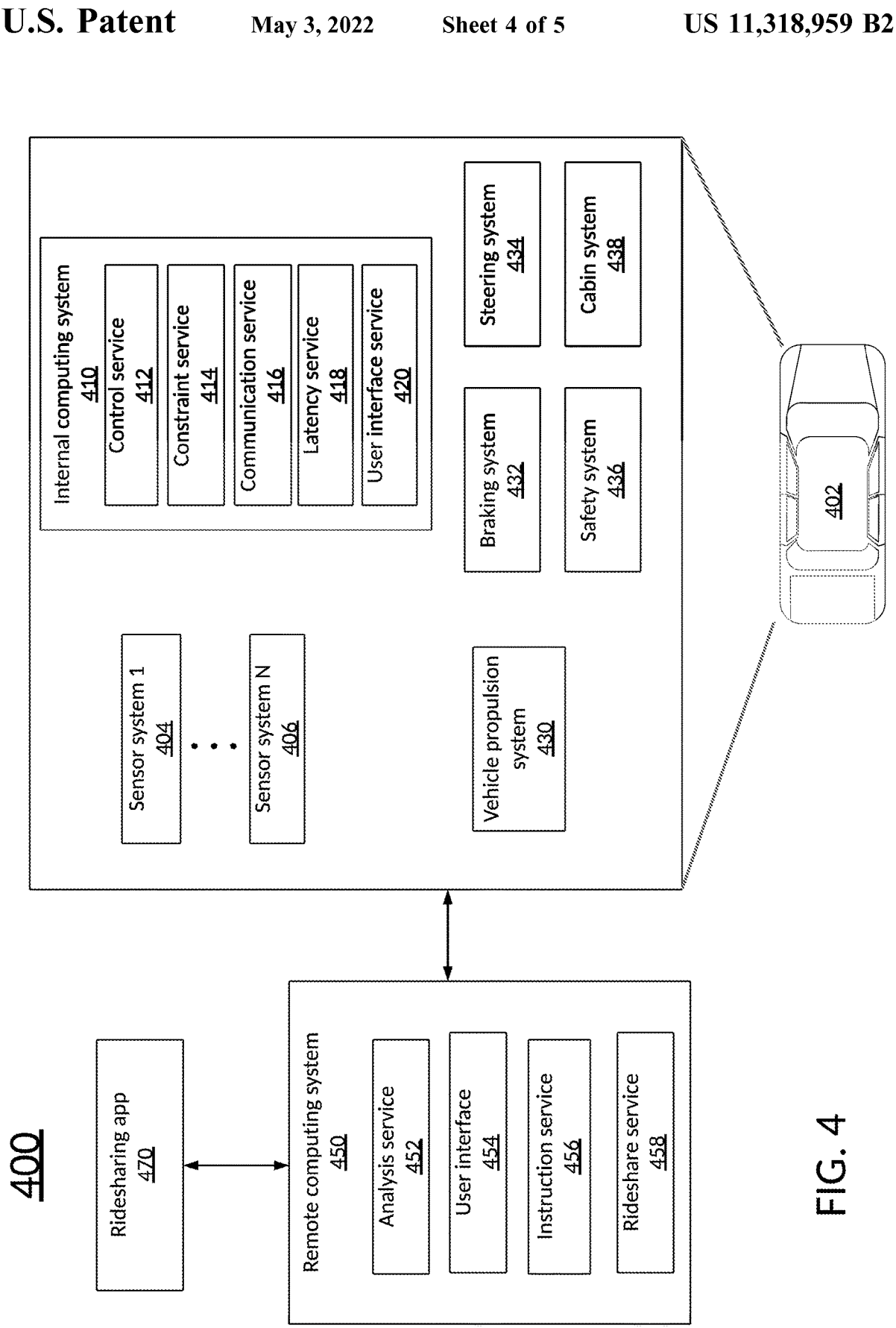
FIG. 4 illustrates an example system environment that can be used to facilitate AV dispatch and operations, according to some aspects of the disclosed technology.

FIG. 4 illustrates an example system environment that can be used to facilitate AV dispatch and operations, according to some aspects of the disclosed technology. Autonomous vehicle 402 can navigate about roadways without a human driver based upon sensor signals output by sensor systems 404-406 of autonomous vehicle 402. Autonomous vehicle 402 includes a plurality of sensor systems 404-406 (a first sensor system 104 through an Nth sensor system 106). Sensor systems 404-406 are of different types and are arranged about the autonomous vehicle 402. For example, first sensor system 404 may be a camera sensor system and the Nth sensor system 406 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 480 are illustrated coupled to the autonomous vehicle 402, it is understood that more or fewer sensors may be coupled to the autonomous vehicle 402.

Autonomous vehicle 402 further includes several mechanical systems that are used to effectuate appropriate motion of the autonomous vehicle 402. For instance, the mechanical systems can include but are not limited to, vehicle propulsion system 430, braking system 432, and steering system 434. Vehicle propulsion system 430 may include an electric motor, an internal combustion engine, or both. The braking system 432 can include an engine brake, brake pads, actuators, and/or any other suitable componentry that is configured to assist in decelerating autonomous vehicle 402. In some cases, braking system 432 may charge a battery of the vehicle through regenerative braking. Steering system 434 includes suitable componentry that is configured to control the direction of movement of the autonomous vehicle 402 during navigation. Autonomous vehicle 402 further includes a safety system 436 that can include various lights and signal indicators, parking brake, airbags, etc. Autonomous vehicle 402 further includes a cabin system 438 that can include cabin temperature control systems, in-cabin entertainment systems, etc.

Autonomous vehicle 402 additionally comprises an internal computing system 410 that is in communication with sensor systems 480 and systems 430, 432, 434, 436, and 438. Internal computing system 410 includes at least one processor and at least one memory having computer-executable instructions that are executed by the processor. The computer-executable instructions can make up one or more services responsible for controlling autonomous vehicle 402, communicating with remote computing system 450, receiving inputs from passengers or human co-pilots, logging metrics regarding data collected by sensor systems 480 and human co-pilots, etc.

Internal computing system 410 can include a control service 412 that is configured to control operation of vehicle propulsion system 430, braking system 208, steering system 434, safety system 436, and cabin system 438. Control service 412 receives sensor signals from sensor systems 480 as well communicates with other services of internal computing system 410 to effectuate operation of autonomous vehicle 402. In some embodiments, control service 412 may carry out operations in concert one or more other systems of autonomous vehicle 402. Internal computing system 410 can also include constraint service 414 to facilitate safe propulsion of autonomous vehicle 402. Constraint service 416 includes instructions for activating a constraint based on a rule-based restriction upon operation of autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 412.

The internal computing system 410 can also include communication service 416. The communication service 416 can include both software and hardware elements for transmitting and receiving signals from/to the remote computing system 450. Communication service 416 is configured to transmit information wirelessly over a network, for example, through an antenna array that provides personal cellular (long-term evolution (LTE), 3G, 4G, 5G, etc.) communication.

Internal computing system 410 can also include latency service 418. Latency service 418 can utilize timestamps on communications to and from remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, latency service 418 can enable other systems of autonomous vehicle 402 or a passenger to make necessary decisions or to provide the needed feedback.

Internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 440 regarding reporting data for training and evaluating machine learning algorithms, requesting assistance from remote computing system 450 or a human operator via the remote computing system 450, software service updates, rideshare pickup and drop off instructions, etc.

Remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402. Remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

Remote computing system 450 can also include an instruction service 456 for sending instructions regarding the operation of the autonomous vehicle 402. For example, in response to an output of the analysis service 452 or user interface service 454, instructions service 456 can prepare instructions to one or more services of the autonomous vehicle 402 or a co-pilot or passenger of the autonomous vehicle 402. Remote computing system 450 can also include rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc. Remote computing system 450 can, in some cases, include at least one computing system 450 as illustrated in or discussed with respect to FIG. 5, or may include at least a subset of the components illustrated in FIG. 5 or discussed with respect to computing system 450.

Figure 5:
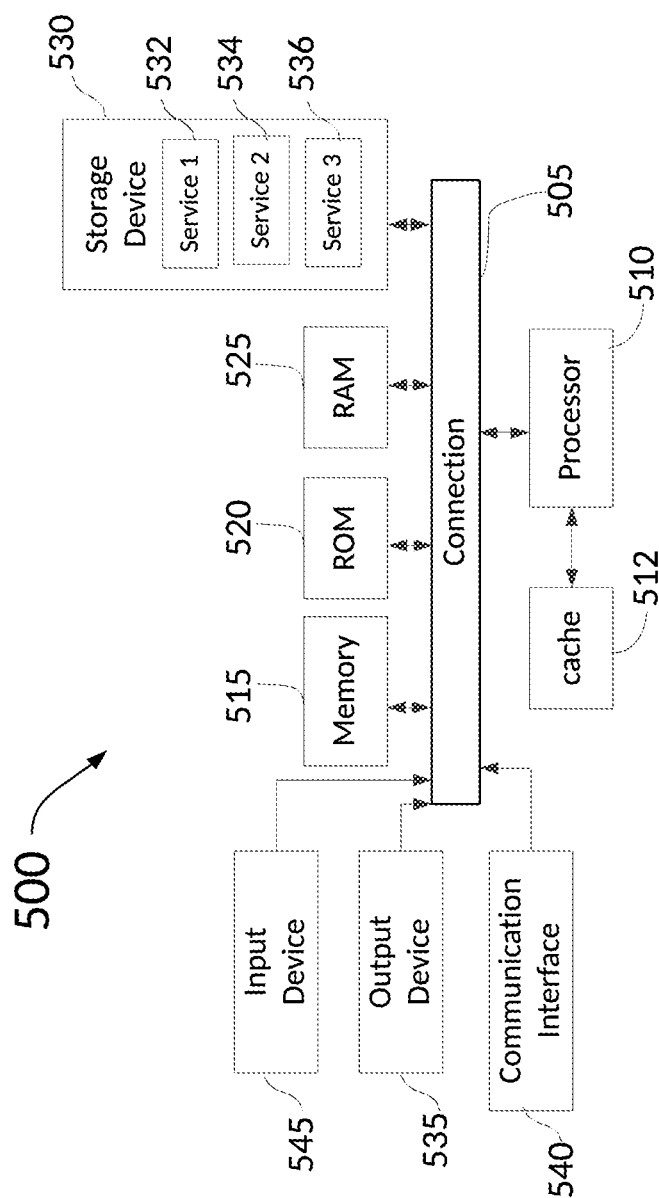
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 410, remote computing system 450, a passenger device executing the rideshare app 470, internal computing device 430, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

FIG. 5 illustrates an example processor-based system with which some aspects of the subject technology can be implemented. Specifically, FIG. 5 illustrates system architecture 500 wherein the components of the system are in electrical communication with each other using a bus 505. System architecture 500 can include a processing unit (CPU or processor) 510, as well as a cache 512, that are variously coupled to system bus 505. Bus 505 couples various system components including system memory 515, (e.g., read only memory (ROM) 520 and random access memory (RAM) 525, to processor 510.

System architecture 500 can include a cache of high-speed memory connected directly with, in close proximity to, or integrated as part of the processor 510. System architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. Memory 515 can include multiple different types of memory with different performance characteristics. Processor 510 can include any general purpose processor and a hardware module or software module, such as module 1 (532), module 2 (534), and module 3 (536) stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms. In some instances, multimodal systems can enable a user to provide multiple types of input to communicate with the computing system architecture 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include software modules 532, 534, 536 for controlling processor 510. Other hardware or software modules are contemplated. Storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out various functions of the disclosed technology.

By way of example, instruction stored on computer-readable media can be configured to cause one or more processors to perform operations including: receiving, at an AV computing system, a first dispatch request, wherein the first dispatch request is associated with a first user identifier (ID), receiving, at the AV computing system, a first recognition model, wherein the first recognition model corresponds with the first user ID, receiving, at the AV computing system, an image stream comprising one or more images of pedestrian faces, and providing the one or more images to the first recognition model. In some aspects, the instructions can further cause processors 510 to perform operations for: determining, using the first recognition model, if a first user represented in the one or more images corresponds with the first user ID, unlocking a door of the AV in response to a match between at least one of the one or more images and the first user ID, and/or updating the first recognition model in response to a match between at least one of the one or more images and the first user ID.

In some aspects, memory stored operations/instructions can be configured to further cause processors 510 to perform operations for: receiving a second recognition model corresponding with a second user ID, providing the one or more images to the second recognition model, and determining, using the second recognition model, if a second user represented by the one or more images corresponds with the second user ID. In some approaches, the operations may further cause the processors to perform operations for unlocking a door of the AV in response to a match between at least one of the one or more images and the second user ID.

Depending on the desired implementation, the first recognition model can be a machine-learning model that has been trained using a plurality of facial images of the first user, and wherein the second recognition model is a machine-learning model that has been trained using a plurality of facial images of the second user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for determining an arrival time of an autonomous vehicle (AV), comprising:
    identifying a route between a first map location and a second map location;
    obtaining, from each respective autonomous vehicle (AV) of a set of AVs, sensor data indicating whether the respective AV successfully completed an AV maneuver at one or more locations along the route;
    based on one or more capabilities of a particular AV and the sensor data indicating whether the respective AV successfully completed the AV maneuver at one or more locations along the route, determining a likelihood of a failure by the particular AV to perform one or more AV maneuvers at one or more portions of the route;
    based on the likelihood of the failure by the particular AV to perform the one or more AV maneuvers at the one or more portions of the route, determining a reroute likelihood associated with at least one AV maneuver from the one or more AV maneuvers;
    calculating an estimated time of arrival (ETA) based on the reroute likelihood associated with at least one AV maneuver; and
    sending the calculated ETA to a computing device associated with a user.

2. The computer-implemented method of claim 1, wherein the reroute likelihood associated with the at least one AV maneuver corresponds with a map location.

3. The computer-implemented method of claim 1, wherein the reroute likelihood associated with the at least one AV maneuver corresponds with a lane identifier (ID).

4. The computer-implemented method of claim 1, wherein calculating the ETA is further based on a time of day.

5. The computer-implemented method of claim 1, wherein the one or more capabilities of the particular AV comprise an AV software version of the particular AV, and wherein the likelihood of the failure by the particular AV to perform the one or more AV maneuvers at the one or more portions of the route is at least partly based on the AV software version of the particular AV.

6. The computer-implemented method of claim 1, wherein the reroute likelihood is based on at least one of an AV maneuver type and traffic conditions.

7. The computer-implemented method of claim 1, further comprising:
updating one or more map priors following the at least one AV maneuver.

8. A system for determining an arrival time of an autonomous vehicle (AV), the system comprising:
one or more processors; and
a computer-readable medium comprising instructions stored therein, which when executed by the one or more processors, cause the one or more processors to perform operations comprising:
identifying a route between a first map location and a second map location;
obtaining, from each respective autonomous vehicle (AV) of a set of AVs, sensor data indicating whether the respective AV successfully completed an AV maneuver at one or more locations along the route;
based on one or more capabilities of a particular AV and the sensor data indicating whether the respective AV successfully completed the AV maneuver at one or more locations along the route, determining a likelihood of a failure by the particular AV to perform one or more AV maneuvers at one or more portions of the route;
based on the likelihood of the failure by the particular AV to perform the one or more AV maneuvers at the one or more portions of the route, determining a reroute likelihood associated with at least one AV maneuver from the one or more AV maneuvers;
calculating an estimated time of arrival (ETA) based on the reroute likelihood associated with at least one AV maneuver; and
sending the calculated ETA to a computing device associated with a user.

9. The system of claim 8, wherein the reroute likelihood associated with the at least one AV maneuver corresponds with a map location.

10. The system of claim 8, wherein the reroute likelihood associated with the at least one AV maneuver corresponds with a lane identifier (ID).

11. The system of claim 8, wherein calculating the ETA is further based on a time of day.

12. The system of claim 8, wherein the one or more capabilities of the particular AV comprise an AV software version of the particular AV, and wherein the likelihood of the failure by the particular AV to perform the one or more AV maneuvers at the one or more portions of the route is at least partly based on the AV software version of the particular AV.

13. The system of claim 8, wherein the reroute likelihood is based on at least one of an AV maneuver type and traffic conditions.

14. The system of claim 8, wherein the instructions, when executed by the one or more processors, cause the one or more processors to perform operations comprising:
updating one or more map priors following the at least one AV maneuver.

15. A non-transitory computer-readable storage medium comprising instructions stored therein, which when executed by one or more processors, cause the one or more processors to perform operations comprising:
identifying a route between a first map location and a second map location;
obtaining, from each respective autonomous vehicle (AV) of a set of AVs, sensor data indicating whether the respective AV successfully completed an AV maneuver at one or more locations along the route;
based on one or more capabilities of a particular AV and the sensor data indicating whether the respective AV successfully completed the AV maneuver at one or more locations along the route, determining a likelihood of a failure by the particular AV to perform one or more AV maneuvers at one or more portions of the route;
based on the likelihood of the failure by the particular AV to perform the one or more AV maneuvers at the one or more portions of the route, determining a reroute likelihood associated with at least one AV maneuver from the one or more AV maneuvers;
calculating an estimated time of arrival (ETA) based on the reroute likelihood associated with at least one AV maneuver; and
sending the calculated ETA to a computing device associated with a user.

16. The non-transitory computer-readable storage medium of claim 15, wherein the reroute likelihood associated with the at least one AV maneuver corresponds with a map location.

17. The non-transitory computer-readable storage medium of claim 15, wherein the reroute likelihood associated with the at least one AV maneuver corresponds with a lane identifier (ID).

18. The non-transitory computer-readable storage medium of claim 15, wherein calculating the ETA is further based on a time of day.

19. The non-transitory computer-readable storage medium of claim 15, wherein the reroute likelihood is based on on traffic conditions.

20. The non-transitory computer-readable storage medium of claim 15, wherein the reroute likelihood is based on an AV maneuver type.

* * * * *